US008558188B2

(12) United States Patent
Nikolic et al.

(10) Patent No.: US 8,558,188 B2
(45) Date of Patent: Oct. 15, 2013

(54) METHOD FOR MANUFACTURING SOLID-STATE THERMAL NEUTRON DETECTORS WITH SIMULTANEOUS HIGH THERMAL NEUTRON DETECTION EFFICIENCY (>50%) AND NEUTRON TO GAMMA DISCRIMINATION (>1.0E4)

(75) Inventors: Rebecca J. Nikolic, Oakland, CA (US); Adam M. Conway, Livermore, CA (US); Daniel Heineck, La Jolla, CA (US); Lars F. Voss, Livermore, CA (US); Tzu Fang Wang, Danville, CA (US); Qinghui Shao, Fremont, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/456,182

(22) Filed: Apr. 25, 2012

(65) Prior Publication Data
US 2012/0235260 A1  Sep. 20, 2012

Related U.S. Application Data

(63) Continuation-in-part of application No. 13/014,879, filed on Jan. 27, 2011, now Pat. No. 8,314,400, which is a continuation-in-part of application No. 11/414,288, filed on Apr. 27, 2006, now abandoned.

(60) Provisional application No. 61/509,023, filed on Jul. 18, 2011, provisional application No. 60/675,654, filed on Apr. 27, 2005.

(51) Int. Cl.
*G01T 3/00* (2006.01)
(52) U.S. Cl.
USPC .................................................. 250/390.01

(58) Field of Classification Search
USPC ............................ 250/390.01–390.12, 269.4
See application file for complete search history.

(56) References Cited

U.S. PATENT DOCUMENTS

| 4,941,942 A | 7/1990 | Bruns et al. |
| 6,727,504 B1 | 4/2004 | Doty |
| 6,867,444 B1 | 3/2005 | Hughes |
| 2003/0214699 A1 | 11/2003 | Banin et al. |

(Continued)

OTHER PUBLICATIONS

Conway, A.M., et al., "Numerical Simulations of Pillar Structured Solid State Thermal Neutron Detector: Efficiency and Gamma Discrimination", IEEE Transactions on Nuclear Science, vol. 56, No. 5, 2009, pp. 2802-2807.

(Continued)

*Primary Examiner* — Kiho Kim
(74) *Attorney, Agent, or Firm* — John P. Wooldridge

(57) ABSTRACT

Methods for manufacturing solid-state thermal neutron detectors with simultaneous high thermal neutron detection efficiency (>50%) and neutron to gamma discrimination (>$10^4$) are provided. A structure is provided that includes a p+ region on a first side of an intrinsic region and an n+ region on a second side of the intrinsic region. The thickness of the intrinsic region is minimized to achieve a desired gamma discrimination factor of at least 1.0E+04. Material is removed from one of the p+ region or the n+ region and into the intrinsic layer to produce pillars with open space between each pillar. The open space is filed with a neutron sensitive material. An electrode is placed in contact with the pillars and another electrode is placed in contact with the side that is opposite of the intrinsic layer with respect to the first electrode.

30 Claims, 13 Drawing Sheets

(56) References Cited

U.S. PATENT DOCUMENTS

2004/0241991 A1  12/2004  Aoyama et al.
2005/0258372 A1  11/2005  McGegor et al.
2011/0024635 A1* 2/2011   Shah et al. .................... 250/362

OTHER PUBLICATIONS

Gersch, H., et al., "The effect of Incremental gamma-ray doses and incremental neutron fluences upon the performance of self-biased 10B-coated high-purity epitixial GaAs thermal neutron detectors", Nuclear Instruments and Methods in Physics Research, A 489, 2002, pp. 85-98.

McGregor, D.S., et al., "Thin-filmcoated bulk GaAs detectors for thermal and fast neutron measurements", Nuclear Instruments and Methods, A 466, 2001, pp. 126-141.

McGregor, D.S., et al., "New Surface Morphology for Low Stress Thin-Film-Coated Thermal Neutron Detectors", IEEE Transactions on Nuclear Science, vol. 49, No. 4, 2002, pp. 1999-2004.

Nikolic, R.J., et al., "6:1 aspect ratio silicon pillar based thermal neutron detector filled with 10B", American Institute of Physics, Applied Physics Letters, 93, 2008, pp. 93-95.

Nikolic, R.J., et al., Fabrication of Pillar-Structured Thermal Neutron Detectors, IEEE Nuclear Science Symposium Conference, 2007, pp. 1577-1580.

Nikolic, R.J., et al., "Pillar Structured Thermal Neutron Detector", Int'l Conf. On Solid State and Integrated-Circuit Tech., Beijing, China, 2008, 6 p.

Nikolic, R.J., et al., "Roadmap for High Efficiency Solid-State Neutron Detectors", Proc. Of SPIE, vol. 6013, 2005, 9 p.

Osberg, K., et al., "A Handheld Neutron-Detection Sensor System Utilizing New Class of Boron Carbide Diode", IEEE Sensors Journal, vol. 6, No. 6, 2006, pp. 1531-1538.

Rose, A., "Sputtered Boron Films on Silicon Surface Barrier Detectors," Nuclear Instruments and Methods, vol. 52, 1967, pp. 166-170.

Shultis, J.K., et al., "Efficiencies of Coated and Perforated Semiconductor Neutron Detectors", IEEE Transactions on Nuclear Science, vol. 53, No. 3, 2006, pp. 1659-1665.

Whitney, A.V., et al., "Sub-100 nm Triangular Nanopores Fabricated with the Reactive Ion Etching Variant of Nanosphere Lithography and Angle-Resolved Nanosphere Lithography", American Chemical Society, Nano Letters, vol. 4, No. 8, 2004, pp. 1507-1511.

Wielunski, M., et al., "Study of the sensitivity of neutron sensors consisting of a converter plus Si charged-particle detector", Nuclear Instruments and Methods in Physics Research, A 517, 2004, pp. 240-253.

* cited by examiner

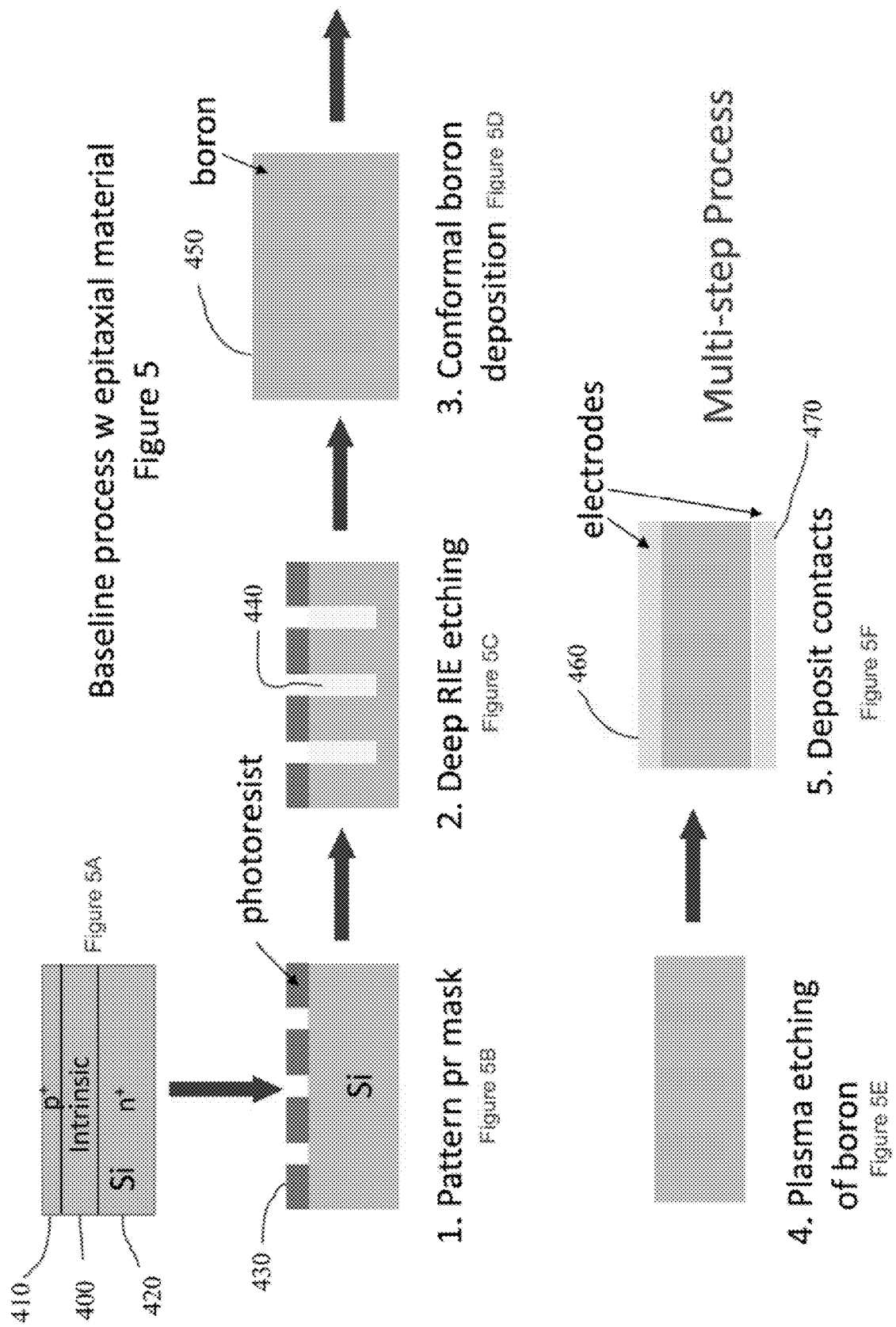

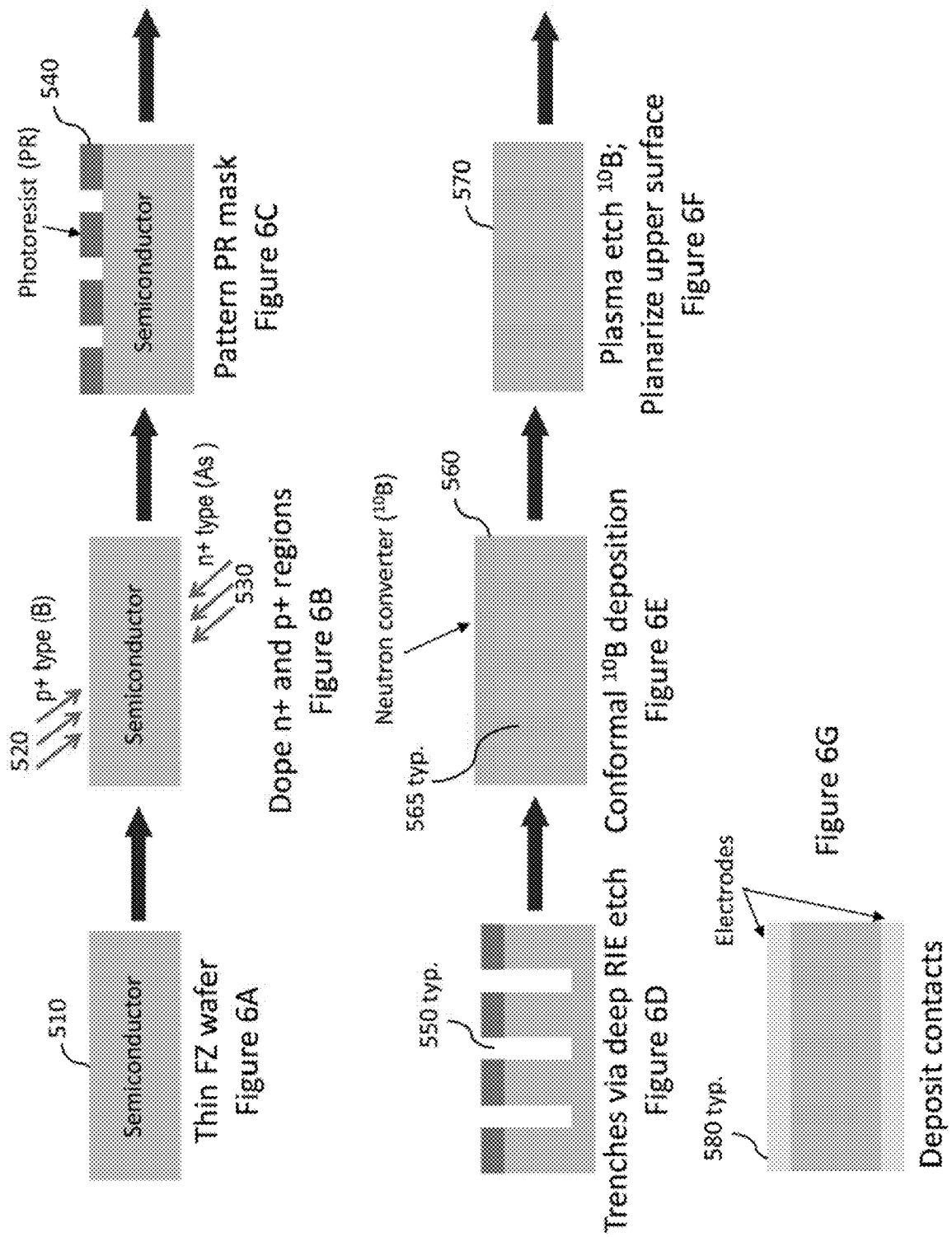

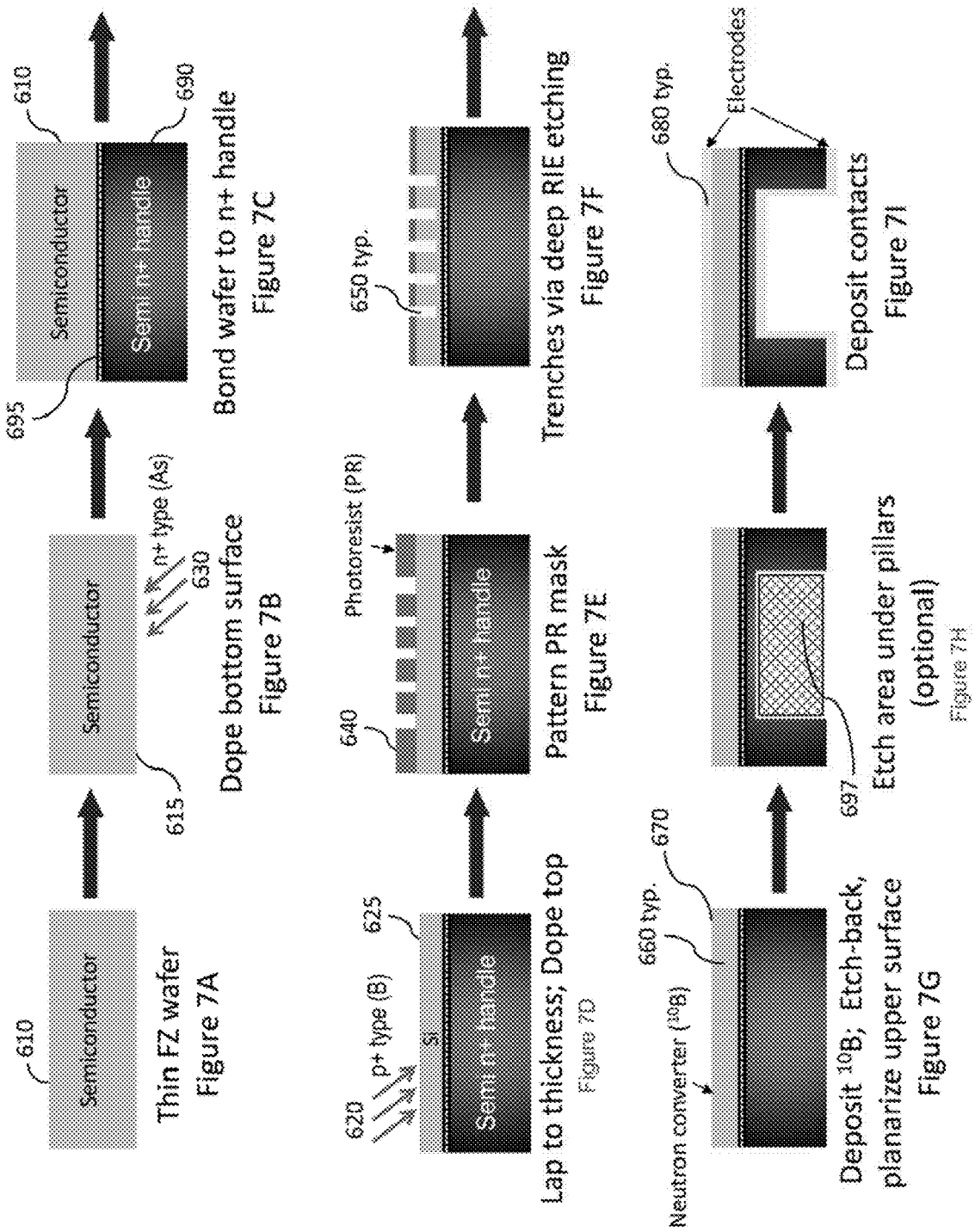

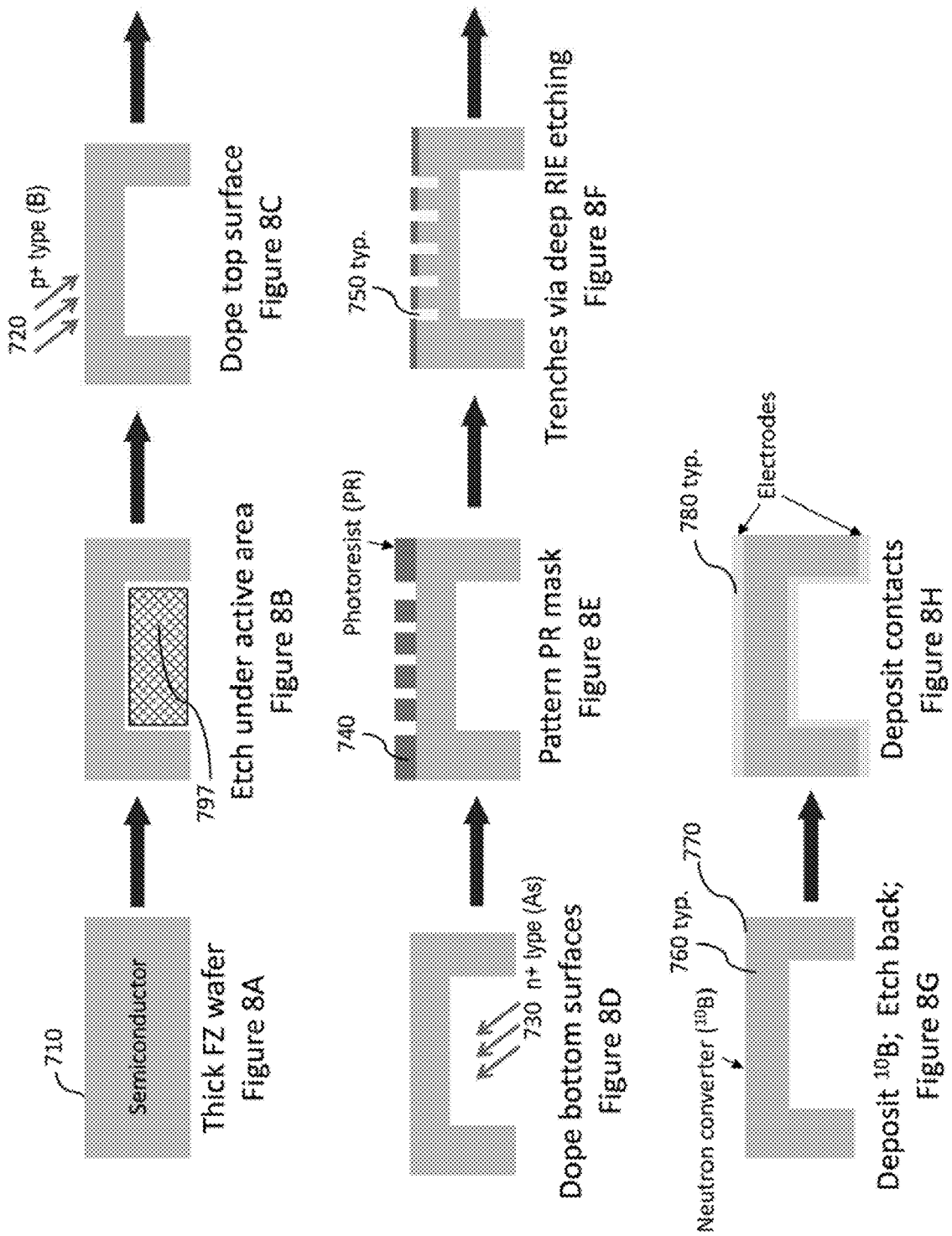

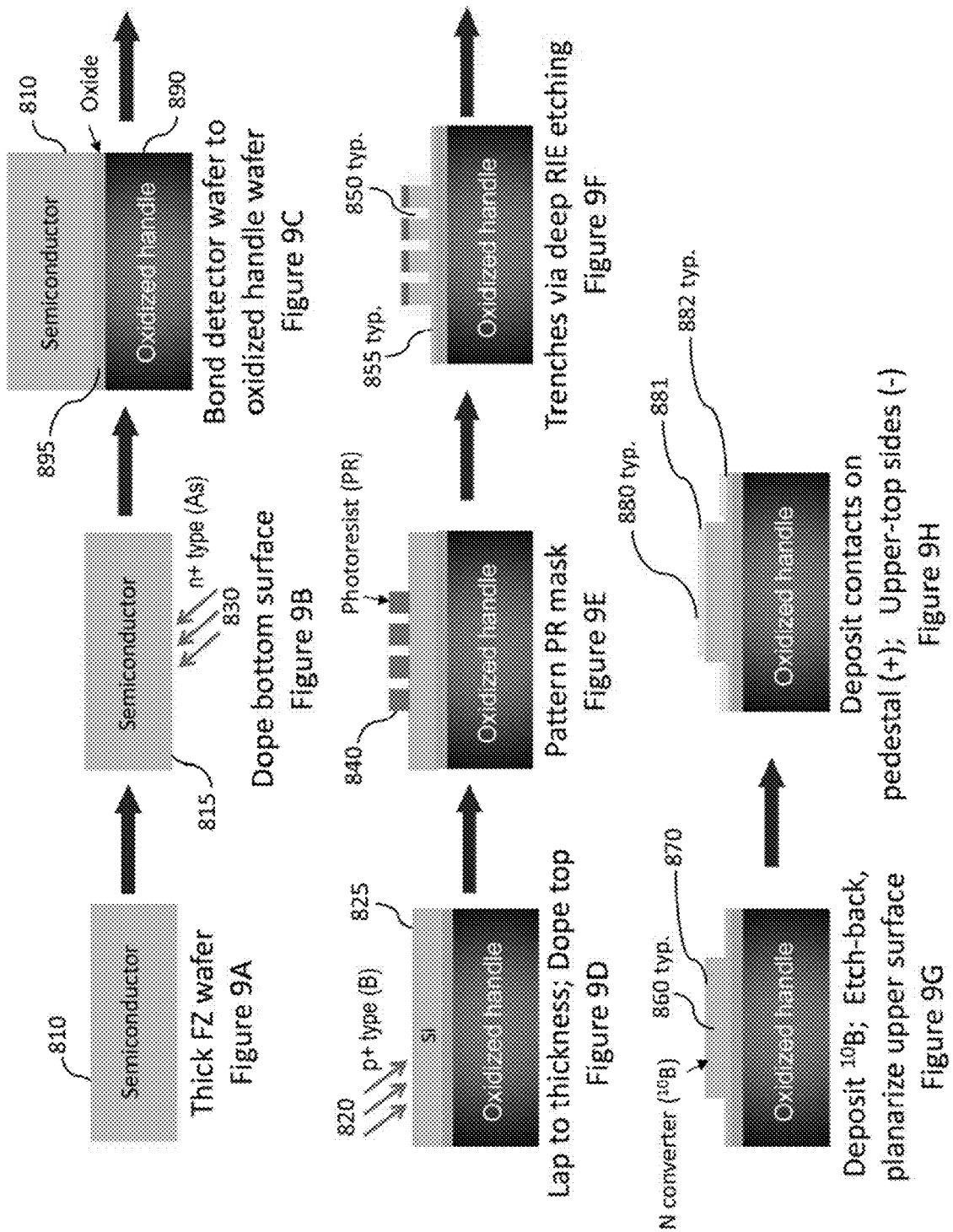

METHOD FOR MANUFACTURING SOLID-STATE THERMAL NEUTRON DETECTORS WITH SIMULTANEOUS HIGH THERMAL NEUTRON DETECTION EFFICIENCY (>50%) AND NEUTRON TO GAMMA DISCRIMINATION (>1.0E4)

CROSS-REFERENCE TO RELATED APPLICATIONS

This is a Continuation in Part of U.S. patent application Ser. No. 13/014,879, titled "Method To Planarize Three-Dimensional Structures To Enable Conformal Electrodes," filed Jan. 27, 2011, incorporated by reference. This application claims priority to U.S. provisional No. 61/509,023, filed Jul. 18, 2011, incorporated herein by reference. U.S. application Ser. No. 13/014,879 is a continuation-in-part of U.S. patent application Ser. No. 11/414,288, titled "Semiconductor Materials Matrix for Neutron Detection," filed Apr. 27, 2006, incorporated herein by reference. U.S. patent application Ser. No. 11/414,288 claims priority to U.S. Provisional Patent Application Ser. No. 60/675,654, titled "Semiconductor Nano-Materials Matrix for Neutron Detection," filed Apr. 27, 2005, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to high efficiency solid state thermal neutron detectors, and more specifically, it relates to process design for high thermal neutron efficiency and high gamma rejection.

2. Description of Related Art

Solid-state thermal neutron detectors are required for a variety of applications, particularly, nonproliferation of special nuclear material (SNM). The currently used technology involves $^3$He tubes, which have a variety of shortcomings when utilized in the field as thermal neutron detectors, including the need for high-voltage operation, sensitivity to microphonics, and large size. Moreover, given that the world's supply of $^3$He is limited, this presents yet another set of critical issues related to strategic and tactical implications, which are of practical importance.

A variety of solid-state thermal neutron detectors have been proposed, which often involve trade-offs between thermal neutron detection efficiency and gamma discrimination, which are two key performance metrics. As an example, by modifying the detector geometry and composition, one can, in general, increase the neutron detection efficiency. However, improving this metric can result in greater false positives and false negatives. That is, in the present art, increasing the sensitivity of the device to detect thermal neutron events can result in a concomitant increase in the response of the detector to gamma ray events. Since the electrical output signature of the detector for neutron and gamma events is typically similar, neutron events can be misinterpreted as gamma events, and, vice versa. It is desirable to provide sensor designs, as well as different fabrication processes, to realize a robust detector that simultaneously achieves high thermal neutron detection efficiency, with high levels of gamma discrimination.

SUMMARY OF THE INVENTION

One aspect of the invention is a method for manufacturing solid-state thermal neutron detectors with simultaneous high thermal neutron detection efficiency (>50%) and neutron to gamma discrimination (>10$^4$). Another aspect is the detector itself. A structure is provided that includes a p+ region on a first side of an intrinsic region and an n+ region on a second side of the intrinsic region. The thickness of the intrinsic region is chosen to achieve a desired neutron to gamma discrimination. Material is removed from (i) one of the p+ region or the n+ region and (ii) the intrinsic layer to produce pillars with open space between each pillar. The pillars have a pitch within a range from about 0.1 µm to about 10 µm and a height within a range from about 10 µm to about 200 µm. A neutron sensitive material comprising $^{10}$B fills the open space. One electrode is placed in contact with the pillars and another electrode is placed in contact with the opposite side of the intrinsic layer with respect to the first electrode.

Generally, the intrinsic layer thickness is less than about 120 µm and more specifically, may be about 50 µm. In some embodiments, the structure may be initially formed from a thin wafer having a thickness within a range from about 50 µm to about 200 µm. The intrinsic region, in some embodiments, may be a float zone wafer or an epitaxial grown wafer. Pillar pitch may be within a range from 1 µm to about 3 µm and more specifically, may be about 2 µm, in some embodiments. The pillars may, e.g., comprise an aspect ratio selected from the group consisting of (i) within a range from about 100:1 to about 10:1, (ii) within a range from about 25:1 to about 10:1 and (iii) about 25:1. The p+ region or the n+ region of the pillars may, e.g., comprise a doping density of at least 1E+18 dopants per cm$^3$. The structure may, e.g., comprise a handle wafer which may further have a doping density of at least 1E+18 dopants per cm$^3$ of conductive semiconductor. The handle wafer may, e.g., be an insulating wafer or a wafer with a insulating top layer and may have an etched area to decrease the area under the pillars to increase gamma rejection. The thickness of the intrinsic layer under the pillars may, e.g., be within a range from about 0 µm to about 100 µm.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 5A shows a first fabrication method to realize a neutron detector with large gamma discrimination using epitaxial growth.

FIG. 5B shows the second step of the process, whereby a photoresist pattern is applied to one surface of the wafer to define the pillar regions.

FIG. 5C shows the third step of the process, whereby high-aspect ratio cavities are formed via deep reactive ion etching.

FIG. 5D shows the fourth step of the process, whereby a neutron converter material is deposited onto the overall structure.

FIG. 5E shows the fifth step of the process, whereby the structure is plasma etched.

FIG. 5F shows the sixth and final step of the process, whereby conformal electrodes are deposited onto the opposing surfaces of the overall structure.

FIG. 6A shows a second fabrication method to realize a neutron detector with large gamma discrimination using a thin substrate approach using ion implantation.

FIG. 6B shows the second step of the process, whereby the wafer is doped on opposing surfaces with p-type and n-type materials, respectively; alternately the p+ and n+ regions can be defined by epitaxial growth.

FIG. 6C shows the third step of the process, whereby a photoresist pattern is applied to one surface of the wafer to define the pillar regions.

FIG. 6D shows the fourth step of the process, whereby high-aspect ratio cavities are formed via deep reactive ion etching.

FIG. 6E shows the fifth step of the process, whereby a neutron converter material is deposited onto the overall structure.

FIG. 6F shows the sixth step of the process, whereby the structure is plasma etched.

FIG. 6G shows the seventh and final step of the process, whereby conformal electrodes are deposited onto the opposing surfaces of the overall structure.

FIG. 7A shows a third fabrication method to realize a neutron detector with large gamma discrimination using a high resistivity float zone material and wafer bonded to a low resistivity substrate.

FIG. 7B shows the second step of the process, whereby the wafer is doped on the bottom surface with an n+ type material.

FIG. 7C shows the third step of the process, whereby the bottom surface of the initial thin wafer is bonded to a thick, n+ type semiconductor handle-wafer.

FIG. 7D shows the fourth step of the process, whereby the exposed upper surface of the wafer is lapped to the desired thickness, and, is subsequently doped with a p+ type material.

FIG. 7E shows the fifth step of the process, whereby a photoresist pattern is applied to the upper surface of the wafer to define the pillar regions.

FIG. 7F shows the sixth step of the process, whereby high-aspect ratio cavities are formed via deep reactive ion etching.

FIG. 7G shows the seventh step of the process, whereby a neutron converter material is conformally deposited onto the upper surface of the structure, followed by a plasma back-etch.

FIG. 7H shows the eighth step of the process which is optional, whereby the thick n+ semiconductor handle-substrate is selectively wet-etched (or dry etched) in the region directly under the pillar area.

FIG. 7I shows the ninth and final step of the process, whereby conformal electrodes are deposited onto the opposing surfaces of the overall structure.

FIG. 8A shows a fourth fabrication method to realize a neutron detector with large gamma discrimination using a back-etching approach, applied directly to a single, thick wafer, to selectively remove a region underneath the active pillar area. The first step involves cutting and polishing a thick semiconductor wafer.

FIG. 8B shows the second step of the process, whereby the thick semiconductor wafer substrate is selectively back-etched directly under the region that will define the eventual pillar area.

FIG. 8C shows the third step of the process, whereby the top surface of the wafer is doped with a p+ type material.

FIG. 8D shows the fourth step of the process, whereby the bottom (back-etched) surface of the wafer is doped with an n+ type material.

FIG. 8E shows the fifth step of the process, whereby a photoresist pattern is applied to the upper surface of the wafer to define the pillar regions.

FIG. 8F shows the sixth step of the process, whereby high-aspect ratio cavities are formed via deep reactive ion etching of the top surface.

FIG. 8G shows the seventh step of the process, whereby a neutron converter material is conformally deposited onto the upper surface of the structure, followed by a plasma back-etch.

FIG. 8H shows the eighth and final step of the process, whereby conformal electrodes are deposited onto the opposing surfaces of the overall structure.

FIG. 9A shows a fifth fabrication method to realize a neutron detector with large gamma discrimination, using an electronically passive and coated handle-wafer approach, to which is bonded the detector wafer and the volume of semiconductor material is etched off early in the process. The first step involves cutting and polishing a thick FZ semiconductor wafer.

FIG. 9B shows the second step of the process, whereby the detector wafer is doped on the bottom surface with an n+ type material.

FIG. 9C shows the third step of the process, whereby the bottom surface of the detector wafer is bonded to a thick, oxidized handle-wafer.

FIG. 9D shows the fourth step of the process, whereby the exposed upper surface of the wafer is lapped to the desired thickness, and, is subsequently doped with a p+ type material.

FIG. 9E shows the fifth step of the process, whereby a photoresist pattern is applied to the central region of the upper surface of the wafer to define the pillar regions.

FIG. 9F shows the sixth step of the process, whereby high-aspect ratio cavities and thin perimeter layers are formed via deep reactive ion etching.

FIG. 9G shows the seventh step of the process, whereby a neutron converter material is conformally deposited onto the central region of the upper surface of the structure, followed by a plasma back-etch over the entire upper surface.

FIG. 9H shows the eighth and final step of the process, whereby conformal electrodes are deposited onto the central pedestal and to the thin perimeter region of the upper surface of the overall structure forming a transverse circuit configuration.

DETAILED DESCRIPTION OF THE INVENTION

The platform for thermal neutron detection described herein is based on an array of pillar structured p-i-n semiconductor diodes within which a thermal neutron conversion material, such as $^{10}B$, has been interspersed. The salient features of this class of detector are briefly reviewed, followed by embodiments that enhance the detector performance in terms of improved neutron detection sensitivity, concomitant with greater levels of gamma ray discrimination. In the example drawings, the top of the pillar is p+ with n+ as the substrate. The opposite can be done having n+ as the top of the pillar with an p+ substrate. Doping can be done by ion implantation, diffusion or by epitaxial growth. The pillars can be squares, circles, hexagons, etc. While the target design was 50 microns, embodiments of the pillars can be within a broader range, e.g., in the range of 25-100 microns tall.

Figure 1:
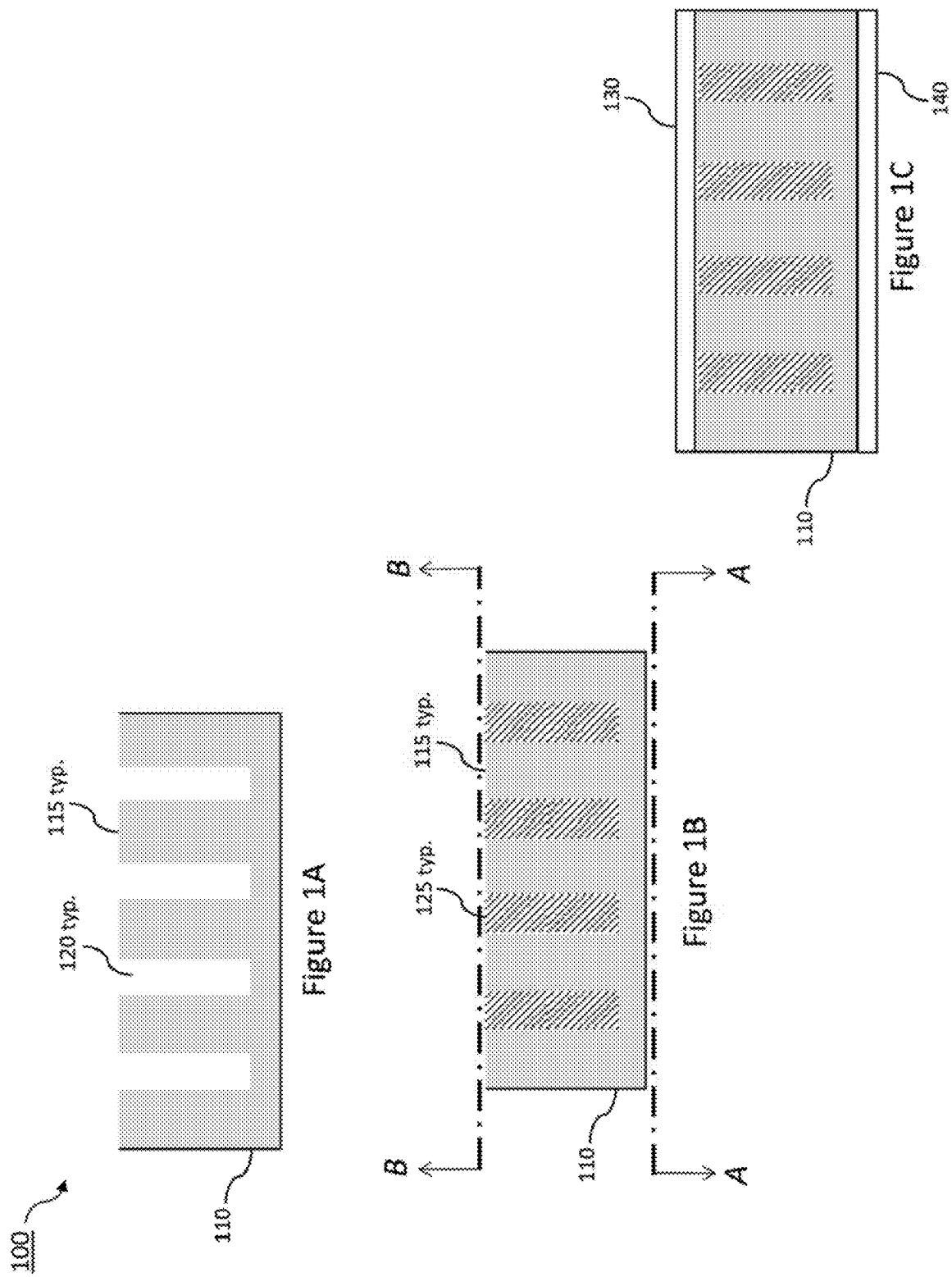
FIG. 1A depicts a three-dimensional device structure, consisting of a monolithic substrate of one material, with an array of high-aspect ratio pillars with cavity regions etched between the pillars.
FIG. 1B depicts a three-dimensional structure with an array of high aspect ratio pillars, whose cavities regions contain a second material, which serves as an active (i.e., functional) region or as a passive (i.e., support) region.
FIG. 1C depicts the structure of FIG. 1B with conformal electrode coatings on opposing surfaces forming a compact sensor of other electronic device.

A basic pillar-based thermal neutron detector is shown in FIGS. 1A, 1B and 1C. A schematic drawing of a general three-dimensional neutron detector structure 100, in cross section, is shown in FIG. 1A. It consists of substrate 110, etched to form an array of pillars, 115, with inter-dispersed cavity regions (the gaps between the pillars) 120, filled with a suitable material, which can differ from that of the substrate material. Typically, the lower surface of structure 100, depicted by cross section A-A in FIG. 1B, consists of a single material, typically a semiconductor, such as Si, which is a substrate of the overall structure. The upper surface of structure 100, depicted by cross section B-B in FIG. 1B, consists of several different materials, whose mechanical and compositional properties can differ in general. Inter-dispersed in the regions between the pillars is a second material 125, as shown in FIG. 1B. This second material 125, in the case of a thermal neutron detector, consists of $^{10}B$. The aspect ratio of the structure, namely, the ratio of the height of the pillars relative to its width can vary from about 1:1 to 1000:1. For thermal neutron detection, the aspect ratio is in the range of 10:1 to 100:1; the pitch as well as the pillar cross section dimension is in the range 1 to 10 μm, and the pillar height is in the range of 10 μm to 100 μm.

As shown in FIG. 1C, electrical contact to the detector consists of upper and lower conductive layers, 130 and 140, respectively, that bound the active region of the sensor. In order to realize functionality and reliability of such three-dimensional structures, it is necessary to deposit a global electrical contact, interconnecting the tops of the pillar-arrayed structure. As an example, the lower surface of the substrate 110 can consist of an n+ layer, whereas the top region of each Si pillar 115, as shown in FIG. 1B, can consist of a p+ layer of a p-i-n diode. Preferred processing techniques to circumvent otherwise detrimental non-uniform morphology, including planarization techniques to provide a robust, contiguous and conformal electrode across the upper surface of the pillared structure, are discussed in U.S. patent application Ser. No. 13/014,879, incorporated herein by reference.

Figure 2:
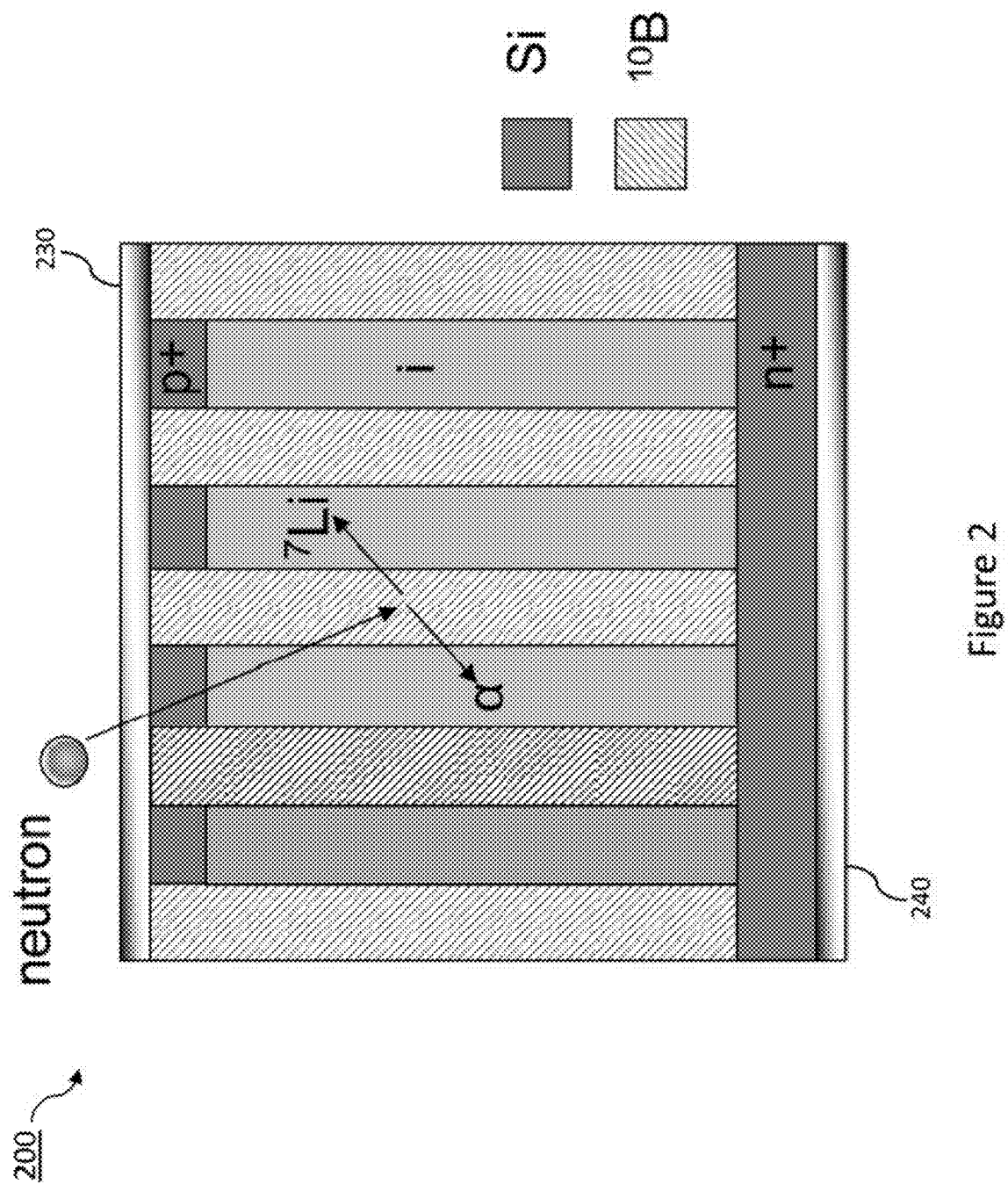
FIG. 2 shows a schematic of a pillar-structured, solid-state thermal neutron detector.

An example of a completed thermal neutron detector, 200, is shown in FIG. 2. This figure also depicts an example of a typical neutron event and its interaction with the detector. Owing to the high neutron interaction cross section with $^{10}B$, the neutrons primarily interact in those regions of the detector. The resultant products of this key interaction channel include a $^{7}Li$ particle and an alpha particle. The alpha and $^{7}Li$ particle subsequently interacts in the neighboring intrinsic Si regions, giving rise to electron-hole pairs, whose resultant current is sensed across electrodes 230 and 240. An example of an undesirable event (not shown) is the interaction of a gamma ray with the detector, which can also give rise to an electron-hole pair, and, hence, result in a deleterious false alarm.

The pillar-structured, solid-state thermal neutron detector of FIG. 2 is a basic detector geometry that enables the optimization of two physical detector mechanisms: (i) a relatively long interaction length (≈50 μm in the longitudinal direction along the length of the $^{10}B$ fill material) for the incident thermal neutrons to interact with the $^{10}B$, to optimize the generation of the decay products—an alpha particle and a $^{7}Li$-ion and (ii) a relatively short interaction length (≈2 μm in the lateral direction) for the alpha and $^{7}Li$ decay products to interact with the Si pillars, to optimize the generation of electron-hole pairs in the Si p-i-n pillars for detection of the neutron event.

Figure 3:
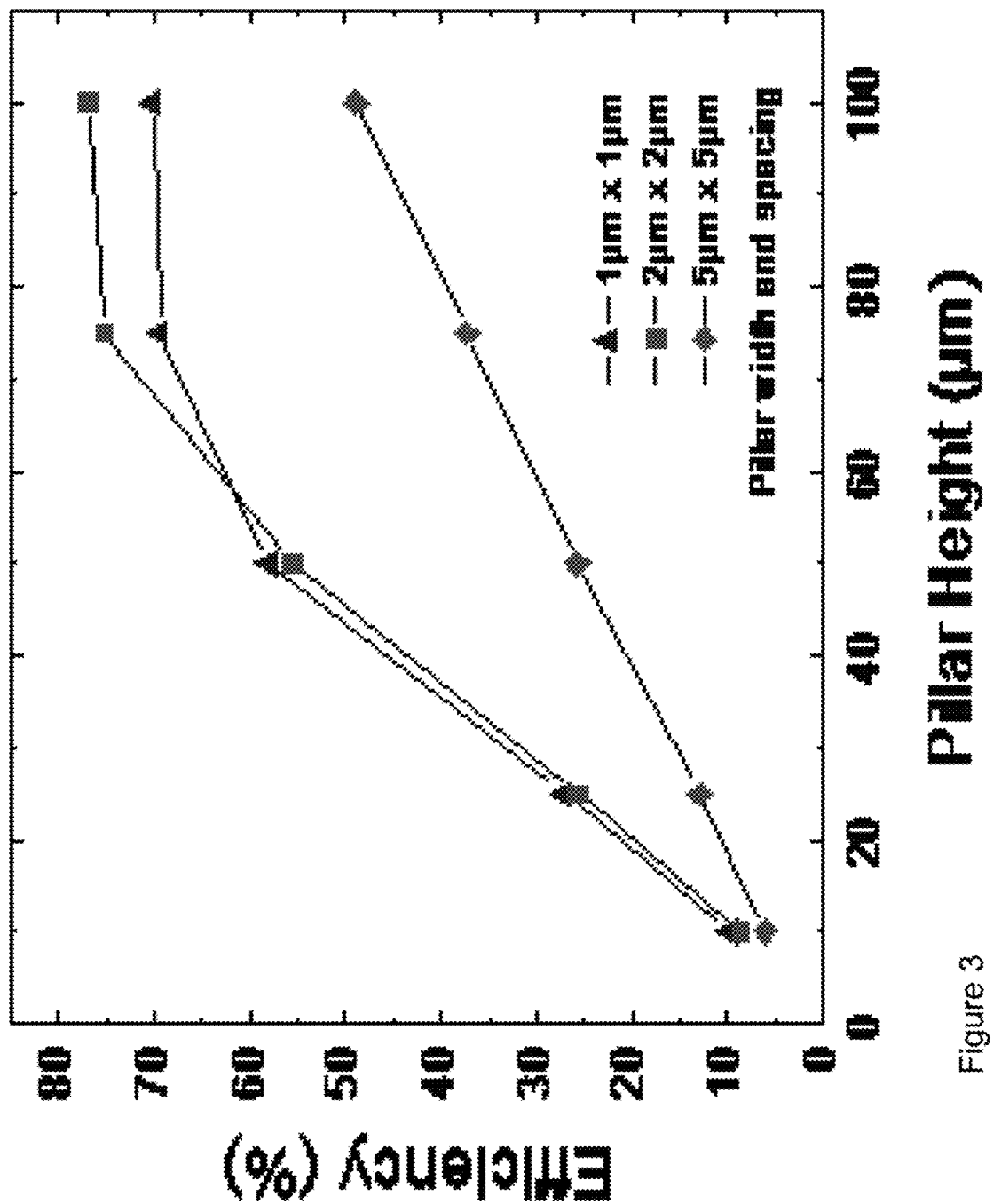
FIG. 3 shows a Monte Carlo simulation depicting the thermal neutron detection efficiency as a function of pillar height for several different pillar widths and spacings.

The choice of the various detector dimensions, aspect ratios, materials and sensor geometry will all have influence on the performance of the detector. As an example, the thermal neutron detection efficiency scales with the pillar height and inversely with pillar width, as shown in FIG. 3. In addition to the detection efficiency, neutron detectors have an additional figure-of-merit based on the ability to discriminate between the sensing of desired events relative to that of all other channels. In the present case, a desired event is defined as an output signal resulting from the interaction of a thermal neutron with the detector, whereas, an example of an undesired event is an output signal resulting from the interaction of a gamma ray with the detector, with both normalized to their respective detection probabilities. The present invention optimizes this discrimination metric, so that the false alarm rates (positive and negative) are minimized.

The Monte Carlo simulation of FIG. 3 depicts the thermal neutron detection efficiency as a function of pillar height for several different pillar widths and spacings. It shows high thermal neutron detection is possible with 50 μm pillar height and close spaced pillars. The neutron detection efficiency is related to the volume of boron and e/h charged carrier collection. The gamma response is related to the total thickness of semiconducting material between the electrodes and dependent on the doping concentration, n or p type, and electric field.

The discrimination between (undesirable) gamma events and (desirable) neutron events, henceforth referred to as "gamma discrimination," is defined as the thermal neutron detection efficiency divided by the gamma detection efficiency. To adequately distinguish between events resulting from thermal neutron events and background gamma events (typical for most practical implementations), the neutron-to-gamma discrimination must be on the order of, or greater than, $1 \times 10^4$. Detectors in the art include $^{3}He$ tubes, which possess gamma discriminations of $1 \times 10^8$. Thus, a solid-state thermal neutron detector, as described herein, capable of reaching or exceeding that metric, is highly desirable by the end-user community.

Figure 4A:
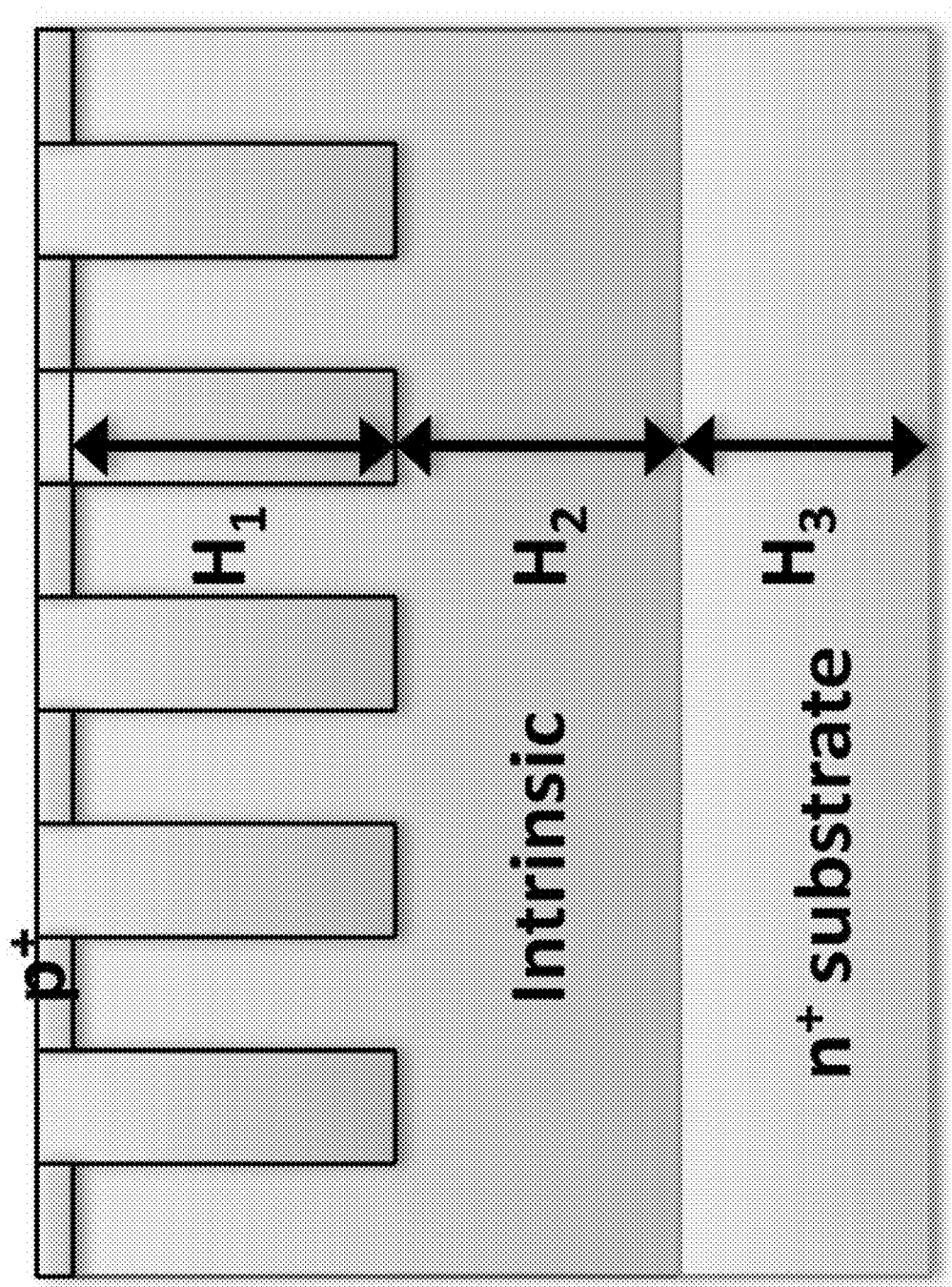
FIG. 4A shows a schematic of a pillar-structured, solid state thermal neutron detector.

FIG. 4A shows a schematic of a pillar-structured, solid state thermal neutron detector. $H_1$, $H_2$, and $H_3$ are depicting pillar height, intrinsic layer thickness below pillars and high doped substrate thickness, respectively. For neutron detection, the neutron absorption takes place in neutron conversion material which is defined by pillar size, pitch and height ($H_1$). Pillar height should be sufficiently tall for neutron absorption (50 μm). Generated carriers are swept into n+ and p+ layers by an electric field induced by either built-in voltage or external reverse bias. For gamma detection, the gamma absorption takes place in the whole silicon portion (p+, intrinsic, n+ substrate). Carriers generated in the intrinsic region ($H_1$ and $H_2$) are collected by carrier drift induced the by electric field, and carriers generated in p+ region and n+ substrate ($H_3$) are collected by carrier diffusion. The portion of collected carriers depends on carrier diffusion length which is determined by doping concentration.

In general, increasing pillar height ($H_1$) enhances both neutron and gamma absorption. Increasing $H_2$ increases gamma absorption only since the intrinsic layer below pillars is only sensitive to gamma rays. This layer should be reduced as much as possible in order to obtain high gamma rejection. Increasing $H_3$ enhances gamma absorption, but the gamma counts will saturate when $H_3$ is much thicker than the carrier's diffusion length.

Figure 4B:
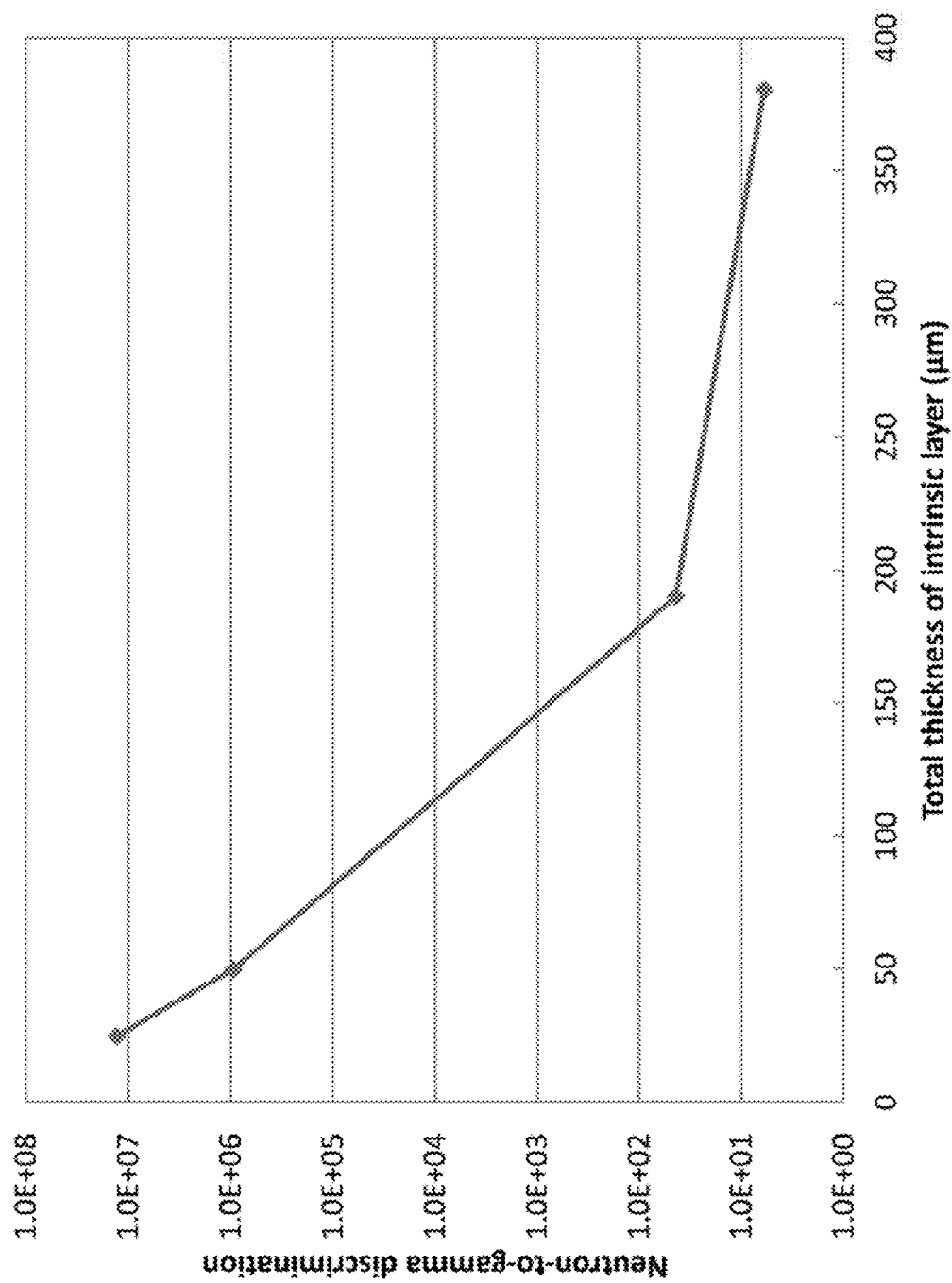
FIG. 4B shows the measured gamma discrimination with gamma energy of 662 keV as a function of total thickness of intrinsic layer.

FIG. 4B shows the measured gamma discrimination with gamma energy of 662 keV as a function of total thickness of intrinsic layer. The total thickness (H) is the sum of pillar height, $H_1$ and the thickness of intrinsic layer below pillars ($H_2$). Pillar heights are 25 μm, 50 μm, 50 μm and 50 μm for four samples with total intrinsic layer thickness of 25 μm, 50 μm, 190 μm and 380 μm respectively. The discrimination value is dramatically decreased from $1.3 \times 10^7$ down to 44 by increasing the intrinsic layer thickness to 190 μm. To obtain gamma discrimination of $1 \times 10^5$, the total intrinsic thickness should be reduced to less than ~80 μm.

TABLE 1

Neutron-to-gamma discrimination per intrinsic layer thickness

| Intrinsic thickness (μm) | Neutron-to-gamma discrimination |
| --- | --- |
| 25 | 1.30E+07 |
| 50 | 9.40E+05 |
| 190 | 44 |
| 380 | 6 |

Figure 4C:
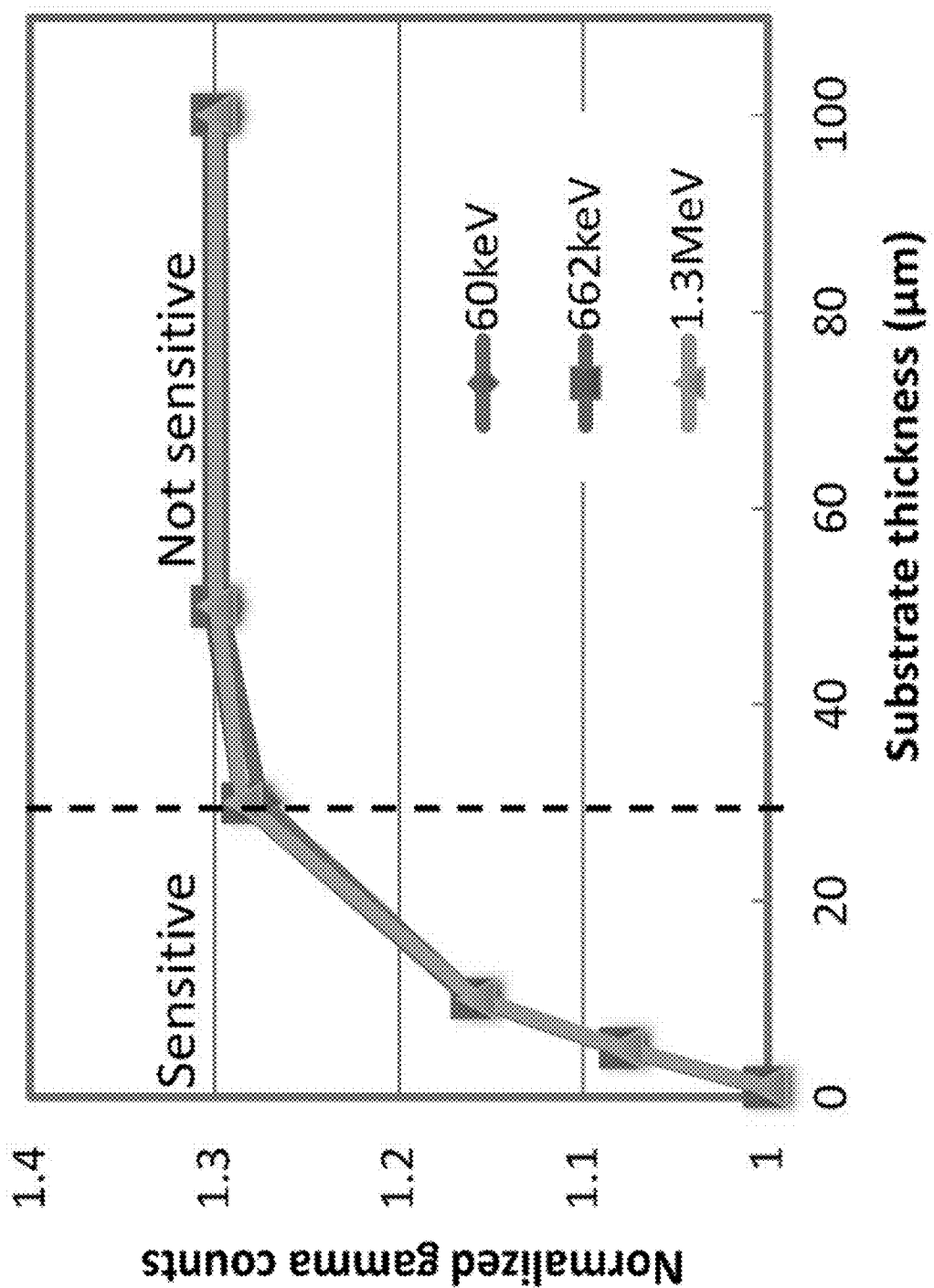
FIG. 4C shows simulation of gamma absorption with gamma sources: $^{241}$Am (60 keV), $^{137}$Cs (662 keV), and $^{60}$Co (1.3 MeV) respectively.
Figure 4D:
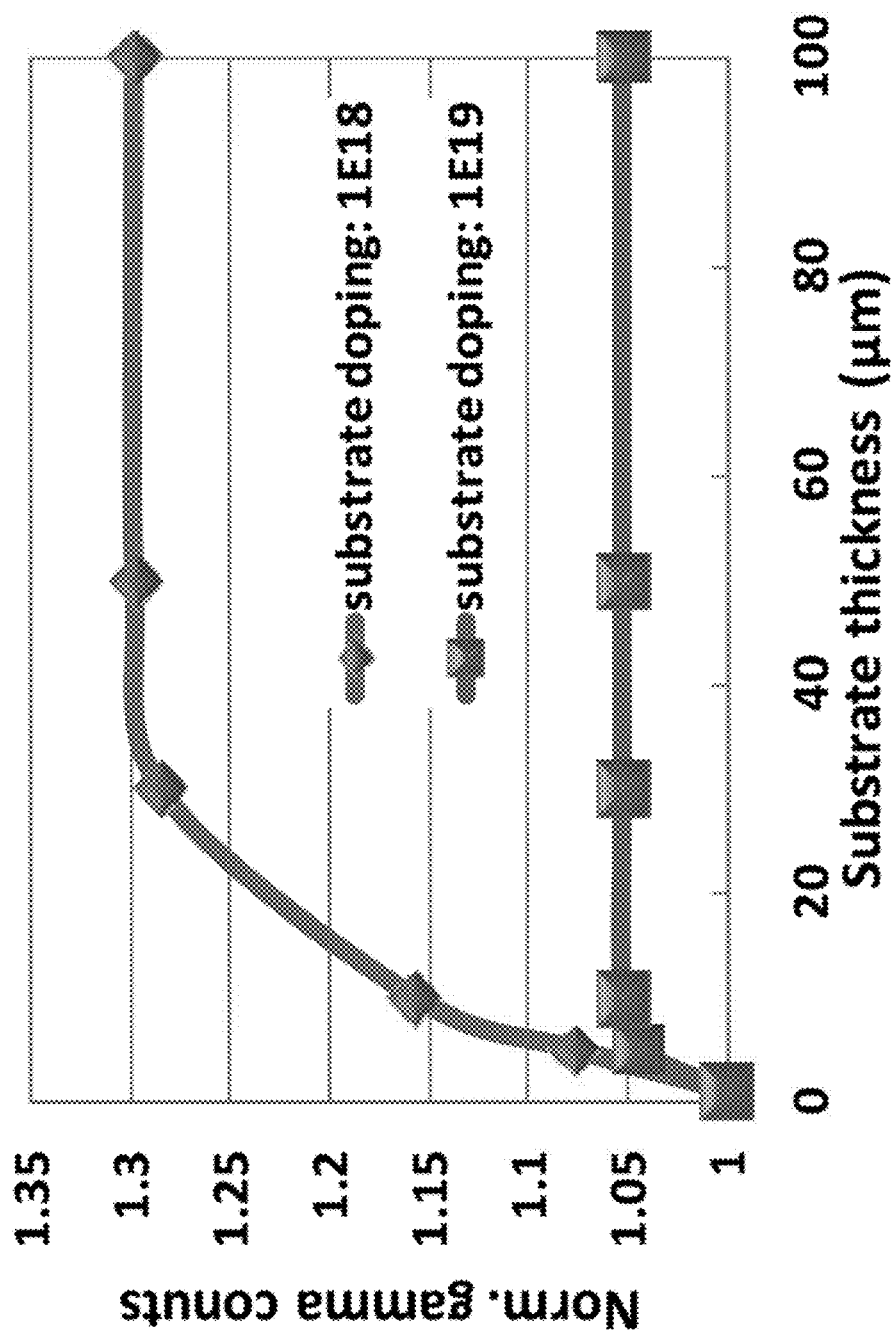
FIG. 4D shows the effect of substrate doping on gamma counts with incident gamma energy of 1.3 MeV.

FIG. 4C shows a simulation of gamma absorption with gamma sources: $^{241}$Am (60 keV), $^{137}$Cs (662 keV), and $^{60}$Co (1.3 MeV) respectively. The tendency of substrate thickness dependence remains the same regardless of gamma energies, as shown by the overlapping plots. The gamma counts become saturated (98% of maximum gamma counts) at 30 μm due to the minority carrier (hole) diffusion length. The carriers generated in this region (0-30 μm) can diffuse into the intrinsic layer and contribute gamma counts. That makes this region "sensitive" to gamma rays. The carriers generated in the region (>30 μm) will recombine before they diffuse into the intrinsic layer and will not contribute gamma counts. That makes this region "not sensitive" to gamma rays. Decreasing the thickness of material under the pillars to make it less than the diffusion length is important. FIG. 4D shows the effect of substrate doping on gamma counts with incident gamma energy of 1.3 MeV. The gamma counts are the same for both doping concentrations when substrates are thin enough to allow all generated minority carriers diffusion into intrinsic region. As compared to 1 μm substrate thickness 28% more gamma counts is expected for substrate thickness above 30 μm for the doping of $1 \times 10^{18}$ cm$^{-3}$. Only 4% more gamma counts are expected for substrate thickness above 5 μm for the doping of $1 \times 10^{19}$ cm$^{-3}$. The higher the doping, the shorter the diffusion length. Thus, less gamma "sensitive" region is present with a highly doped substrate. It is therefore important to increase substrate doping.

TABLE 2

Properties of minority carrier (hole) in highly doped n-Si substrate

| Doping concentration (cm$^{-3}$) | Mobility (cm$^2$/Vs) | Lifetime (μs) | Diffusion Length (μm) |
| --- | --- | --- | --- |
| $1 \times 10^{18}$ | 89.2 | 0.248 | 7.57 |
| $1 \times 10^{19}$ | 50.7 | 0.025 | 1.81 |

Limiting the intrinsic material underneath the pillar and having high substrate doping with the thinnest possible thickness yields high gamma rejection. Accordingly, the present invention provides various process flows to fabricate devices with this ideal high thermal neutron efficiency 50% (but possibilities are between 5-80% with high gamma rejection >1e4).

The fabrication involves removing a substantial amount of material from a substrate in which the pillarized p-i-n diodes are created, thereby maximizing the gamma discrimination factor. Using this approach, however, results in an array of pillars, which is mechanically weaker than the starting material. Thus, there is a trade-off between the mechanical integrity of the device and its performance, in terms of gamma discrimination.

The teachings of this invention describe manufacturing processes to fabricate a solid-state detector capable of achieving large gamma discrimination ($>1 \times 10^4$), and, concomitantly, with good mechanical integrity and high fabrication yield. Some embodiment fabrication methods involve techniques to realize a detector with epitaxial growth or a thin substrate, while maintaining its mechanical integrity. Another method involves techniques to enhance the gamma discrimination factor and robustness of thermal neutron detectors in general, regardless of the substrate thickness. This latter method can also augment any of the thin-substrate embodiments to further enhance the gamma discrimination metric of the detector.

Methods described herein, to enhance the detector performance, include the following: (1) employing a starting substrate that is initially thin (<100 μm); (2) bonding of a thin wafer to a thick n+ substrate wafer, with etch-back under the pillar region; (3) selective etching of the substrate under pillar region within a single substrate; (4) bonding of a thin wafer to a thick insulated substrate that is not electrically active but provides mechanical support; and (5) employing auxiliary active or passive layers, monolithically formed above and/or below the native detector, to enhance the gamma discrimination and to radiation-harden the detector.

U.S. application Ser. No. 13/014,879 describes processing methods to form conformal, large-area electrode contacts across the surfaces of such 3-d, pillarized, high-aspect-ratio detectors, including planarization techniques. One skilled in the art will appreciate which choice of planarization technique, as taught in the parent application, is best suited to implement a conformal, blanket coating or contact for a given detector configuration and its material composition. These fabrication processes are employed in the present invention, as needed.

Neutron detector with large gamma discrimination.

FIG. 5A shows a first fabrication method to realize a neutron detector with large gamma discrimination using epitaxial growth. The first step involves epitaxial growth of the intrinsic region 400 and p+ region 410 on an n+ substrate 420. FIG. 5B shows the second step of the process, whereby a photoresist pattern 430 is applied to one surface of the wafer to define the pillar regions. FIG. 5C shows the third step of the process, whereby high-aspect ratio cavities 440 are formed via deep reactive ion etching. FIG. 5D shows the fourth step of the process, whereby a neutron converter material 450 is conformally deposited onto the overall structure. FIG. 5E shows the fifth step of the process, whereby the structure is plasma etched. FIG. 5F shows the sixth and final step of the process, whereby conformal electrodes 460 and 470 are deposited onto the opposing surfaces of the overall structure.

Pillarized neutron detectors using a thin substrate, <100 μm in thickness.

As discussed above, the gamma discrimination factor can be improved by fabricating a detector with a thin substrate. One employs various processing techniques to reduce the thickness of an initially thick wafer to a value that meets or exceeds the desired gamma discrimination factor. This process, however, can result in a detector whose structure is mechanically compromised, as well as reducing the manufacturing yield.

In this embodiment, one employs a thin wafer, typically of thickness on the order of 100 μm or less, as a starting material. The wafer thickness is specified to correspond to a desired active region of the final detector. This approach negates the need to reduce the thickness of an otherwise thick wafer, thereby circumventing the possibility of adversely affecting the mechanical integrity of the structure. Moreover, given that the wafer thickness constitutes that of the final detector, and, no additional thinning is required, an intrinsic wafer material can be employed, with each respective surface suitably doped to form the requisite n+ type and p+ type regions of the detector from the onset.

An example of the processing steps using this approach is shown in FIGS. 6A through 6G. As shown in FIG. 6A, a float-zone (FZ) wafer 510 is selected, comprised of a suitable, high-resistivity, intrinsic (undoped) semiconductor material, such as Si. This starting substrate is initially thin, with a thickness on the order of ≈100 μm. The substrate is then heavily doped, as shown in FIG. 6B, to form p+ and n+ regions, 520 and 530, respectively, via ion implantation or diffusion processing on the top and bottom of the wafer, respectively. Boron and Arsenic dopants can be employed to form the p+ and n+ regions, respectively.

The wafer is then coated with photoresist 540 and patterned, with a pitch in the range of 2 to 4 μm, as depicted in FIG. 6C. In the case of a 3-D neutron detector, the pattern on the surface is in the form of a 2-dimensional grid of squares, as viewed from above the top surface. High-aspect-ratio pillars 550 are then etched into the material using deep reactive ion etching (RIE), to a depth in the range of 10 μm to 50 μm, as shown in FIG. 6D.

As depicted in FIG. 6E, this is followed by the deposition of a conformal neutron converter material 560, which, in this case, is $^{10}B$. This results in the formation of an array of inlaid pillars 565, each pillar of which typically measuring 2 μm×2 μm in cross section, with a depth of about 50 μm. The converter material is then etched back to reveal the upper surface 570 of the Si substrate matrix, within which is an array of inlaid 10B 565, as shown in FIG. 6F.

The resultant surface is then planarized, per the teachings of the parent patent application (e.g., via a plasma etch). The final step in this process is the formation of the sensor electrodes 580, formed by the deposition of blanket, conformal conductive metalized layers on the top and bottom surfaces of the detector, as shown in FIG. 6G, resulting in ohmic contacts to the p+ and n+ diffused layers, respectively.

Pillarized neutron detectors using a thin or thick substrate, bonded to a thick substrate wafer, with etch-back under the pillar region.

In this embodiment, one employs either a thin or thick intrinsic wafer as the starting substrate material for the detector. The detector substrate is then bonded to a thick handle support wafer. The thick handle support wafer is, in the case of the example of FIGS. 7A-7I, comprised of a n+ material, and, therefore, forms one end of the n-i-p diode structure. Alternately, the thick handle support may be comprises of a p+ material to form one end of the n-i-p structure. In this embodiment, both wafers are then selectively lapped and planarized to form the overall structure. The net substrate thickness of the resultant detector can therefore be minimized to enhance the gamma discrimination factor, while maintaining the mechanical integrity of the sensor as well as optimizing the manufacturing yield.

An example of the processing steps using this second approach is shown in FIGS. 7A through 7I. As shown in FIG. 7A, a float-zone (FZ) wafer 610 is selected as the detector substrate, comprised of a suitable, high-resistivity, intrinsic (undoped) semiconductor material, such as Si. In this approach, the starting detector substrate can be either thin (on the order of ≈100 μm) or relatively thick. As shown in FIG. 7B, the detector substrate is subsequently heavily doped (via ion implantation or diffusion processing, as before) on a single surface 615, which will ultimately form the bottom surface of the resultant detector active region. The dopant can be either n+ or p+ with an example of the former shown in FIG. 7B, e.g., using Arsenic as the n+ type dopant 630.

As shown in FIG. 7C, the detector substrate 610 is then wafer-bonded to a thick "handle wafer" 690. The detector substrate wafer is oriented so that its doped (bottom) surface (n+ in this example) 615 forms an interface 695 (dashed line) with the top of the n+ handle wafer. The handle wafer is chosen to be of the same carrier type as that of the doped bottom surface of the detector wafer. In the example shown in FIG. 7C, the entire handle wafer is chosen to be n+ type, since the bottom surface 615 of the detector wafer is n+ type (the same logic applies in the case of a p+ type interfaced structure). As is known in the art, the method of wafer bonding could be chemically, plasma or heat activated.

In the next processing step, as shown in FIG. 7D, the exposed (upper, or, topside) surface of the initially thick wafer 610 is then lapped down to the desired final thickness of the resultant detector substrate region. (This step is not necessary if the starting detector wafer is initially chosen to be of the desired thickness.) The upper (topside) surface of the (now, thin) detector wafer 625 is then heavily doped with the opposite polarity relative to the bottom surface. In the example shown in FIG. 7D, the exposed surface of the detector wafer is doped as p+ type, using, as an example, Boron as the p+ dopant 620. In this case, the resultant structure, as viewed downward from above the detector wafer 625, forms a p-i-n diode or, in the opposite case (viz., a p+ handle wafer), a n-i-p diode.

Similar steps as described in the above case (Technique 1) above are subsequently performed to form a planar array of converter-material-coated $^{10}B$ pillars. Referring to FIG. 7E, the exposed (top) surface of detector wafer 625 is coated with photoresist 640 and patterned, with a pitch in the range of 2 to 4 μm. In the case of a 3-D neutron detector, the pattern on the surface is in the form of a 2-dimensional grid of e.g., squares (other shapes are within the scope of the invention), as viewed from above the top surface. High-aspect-ratio trenches 650 are then etched into the material using deep reactive ion etching (RIE), to a depth in the range of 10 µm to 50 µm, as shown in FIG. F.

As depicted in FIG. 7G, this is followed by the deposition of a conformal neutron converter material 660, which, in this case, is $^{10}$B. This results in the formation of an array of inlaid pillars, each pillar typically measuring 2 µm×2 µm in cross section, with a depth of about 50 µm. The converter material is then etched back to reveal the upper surface 670 of the substrate matrix, as shown in FIG. 7G. The resultant surface 670 is then planarized, per the teachings of the parent patent application (e.g., via a plasma etch).

FIG. 7H illustrates an optional step wherein the handle wafer 690 is selectively wet etched using a photoresist mask to remove a large fraction of the material directly underneath the active pillar area 697, as depicted by the cross-hatched area. The remaining thin region of the handle wafer forms the n+ layer of the p-i-n array of Si diodes. The final step in this process, as shown in FIG. 7I, is the formation of the sensor electrodes 680, formed by the deposition of blanket, conformal, conductive metalized layers on the top and bottom surfaces of the detector, resulting in ohmic contacts to the p+ and n+ layers, respectively. This technique results in a neutron detector capable of a high gamma discrimination factor, owing to the thin region below the array of $^{10}$B pillars, inlaid within a Si diode array matrix. Moreover, the resultant structure is mechanically stable since the lower part of the detector is comprised of a solid member (the handle wafer).

Pillarized neutron detectors using a thick substrate, with selective etching of the substrate under pillar region.

In this embodiment, one employs a single, thick intrinsic wafer as the starting substrate material for the detector, with selective etching of the substrate under the pillar region. As opposed to the above embodiment, in which a detector substrate is bonded onto a handle wafer, the present embodiment teaches a single, thick starting substrate. In the context of the above embodiment, the use of a single, thick wafer performs the function of the neutron detector wafer as well as the support handle wafer, in a single, solid member.

Hence, the entire neutron detector is formed using the single starting wafer. Therefore, no bonding processes are required, resulting in a structure free of internal interfaces, which could otherwise introduce internal defects across such junctions. This approach, therefore, eliminates the possibility of deleterious surface recombination at internal bond interfaces, while still providing for enhanced gamma discrimination and mechanical integrity.

The processing steps for this embodiment are shown in FIGS. 8A through 8G. As shown in FIG. 8A, a thick, float-zone (FZ) wafer 710 is selected as the detector substrate and support structure. The wafer is comprised of a suitable high-resistivity, intrinsic (undoped) semiconductor material, such as Si. As shown in FIG. 8B, the backside of the wafer under the (soon-to-be-formed) active area is patterned and then selectively wet etched, using a photoresist mask to remove a large fraction of the material directly underneath the active pillar area 797, as depicted by the cross-hatched area in the figure.

As shown in FIG. 8C, the top surface of the structure is subsequently heavily doped (via ion implantation or diffusion processing, as before). In this example, the dopant is Boron, resulting in a p+ type layer, 720. Next, as shown in FIG. 8D, the underside surface of the now-thin region of the handle wafer is heavily doped to form an n+ type layer 730, using, as an example Arsenic as the dopant. Therefore, the structure, as viewed from the upper surface, will form a p-i-n Si diode array. As noted above, the dopants can be interchanged, resulting in a structure of opposite structural polarity (a n-i-p Si diode array).

Similar steps as described in the above case are subsequently performed to form a planar array of converter-material-coated $^{10}$B pillars. Referring to FIG. 8E, the exposed (top) surface of detector wafer 710 is then coated with photoresist 740 and patterned, with a pitch in the range of 2 to 4 µm. In the case of a 3-D neutron detector, the pattern on the surface is in the form of a 2-dimensional grid of squares, as viewed from above the top surface. High-aspect-ratio trenches 750 are then etched into the material using deep reactive ion etching (RIE), to a depth in the range of 10 µm to 50 µm, as shown in FIG. 8F.

This is followed by the deposition of a conformal neutron converter material 760, which, in this case, is $^{10}$B, as depicted in FIG. 7G. This results in the formation of an array of inlaid pillars, each pillar typically measuring 2 µm×2 µm in cross section, with a depth of about 50 µm. The converter material is then etched back to reveal the upper surface 770 of the substrate matrix, as is also shown in FIG. 8G. The resultant surface 770 is then planarized, per the teachings of the parent patent application (e.g., via a plasma etch).

The final step in this process, as shown in FIG. 8H, is the formation of the sensor electrodes 780, formed by the deposition of blanket, conformal, conductive metalized layers on the top and bottom surfaces of the detector, resulting in ohmic contacts to the p+ and n+ layers, respectively. This overall processing technique results in a neutron detector capable of a high gamma discrimination factor, owing to the thin region below the array of $^{10}$B pillars, inlaid within a Si diode array matrix. Moreover, the resultant structure is mechanically stable since the entire detector is fabricated from a single Si wafer.

Pillarized neutron detectors using a thin substrate, bonded to a thick insulated substrate that is not electrically active but provides mechanical support.

In this embodiment, one employs either a thin or thick intrinsic float zone processed wafer as the starting substrate material for the detector. The detector substrate is then bonded to, e.g., a thick insulated support wafer or a wafer with a top insulating region. The thick support wafer in the present embodiment is not electrically active (i.e., it is an insulator), yet, provides mechanical support for the neutron detector. In this embodiment, only the detector wafer requires lapping and planarization to form a thin active region. The substrate thickness of the active detector is minimized to enhance the gamma discrimination factor, while the support wafer maintains the mechanical integrity of the sensor, and, furthermore, improves the manufacturing yield. Given that the support wafer is electrically inactive, the pair of electrical contacts to the active diode wafer, in this case, can be formed on a single relative side of the overall module, at two different surfaces or planes.

An example of the processing steps using this fourth approach is shown in FIGS. 9A through 9H. As shown in FIG. 9A, a float-zone (FZ) wafer 810 is selected as the detector substrate, comprised of a suitable, high-resistivity, intrinsic (undoped) semiconductor material, such as Si. In this approach, the starting detector substrate can be either thin (on the order of ≈100 µm) or relatively thick. As shown in FIG. 8B, the detector substrate is subsequently heavily doped (via ion implantation or diffusion processing, as before) on a single surface 815, which will ultimately form the bottom surface of the detector active region. The dopant can be either n+ or p+ with an example of the former shown in FIG. 9B, using Arsenic as the n+ type dopant 830.

As shown in FIG. 9C, the detector substrate 810 is then wafer-bonded to a thick, oxidized "handle wafer" 890. The detector substrate wafer is oriented so that its doped (bottom) surface (n+ in this example) 815 forms an interface 895 (dashed line) with the oxide layer of the insulating handle wafer. As is known in the art, the method of wafer bonding could be chemically or plasma activated.

In the next processing step, as shown in FIG. 9D, the exposed (upper, or, topside) surface of the initially thick wafer 810 is then lapped down to the desired final thickness of the detector substrate. (This step is not necessary if the starting detector wafer is initially chosen to be of the desired thickness.) The upper (topside) surface of the (now, thin) detector wafer 825 is then heavily doped with the opposite polarity relative to the bottom surface. In the example shown in FIG. 9D, the exposed (top) surface of the detector wafer is doped as p+ type, using, as an example, Boron as the p+ dopant 820. In this case, the resultant structure, as viewed downward from above the detector wafer 825, forms a thin p-i-n diode, which, in turn, is bonded to a thick, insulating, electrically inactive substrate 890.

Similar processing steps, as described in the above embodiments, are subsequently performed to form a planar array of neutron converter $^{10}$B pillars. Referring to FIG. 9E, the exposed (top) surface of detector wafer 825 is coated with photoresist 840 and patterned in the form of a 2-dimensional grid of circles, with a pitch in the range of 2 to 4 μm. Note that the photoresist pillar array pattern for this embodiment is confined to the central area of the surface of the wafer 825. The perimeter region of the wafer that surrounds the central (patterned) area will, after etching, result in a very thin layer of Si, whose doping profile consists of the heavily doped (backside) n+ region. The thin n+ perimeter layer will enable an ohmic contact to be subsequently formed for the bottom wafer surface electrode.

As shown in FIG. 9F, high-aspect-ratio pillars 850 are then etched into the detector wafer material using deep reactive ion etching (RIE), to a depth sufficient to reach the heavily doped backside (n+) region, typically in the range of 10 μm to 100 μm. Hence, the base of the trenches, as well as the exposed surface 855 of the (now) thin layer of Si the surrounds the trenches, reveals the heavily n+ doped backside region of the wafer. The resultant detector surface will therefore consist of a central "pedestal" region of trenches, the perimeter of which is surrounded by a thin layer of Si.

As depicted in FIG. 9G, this is followed by the deposition of a conformal neutron converter material 860, which, in this case, is $^{10}$B. The spatial region of the $^{10}$B deposition is confined to coat only the central trench/pillar area of the wafer. Conventional mask alignment techniques, as is known in the art, can be employed to ensure that deposition of the $^{10}$B is, indeed, limited to the central pillar region, and, furthermore, restricted from coating the (thin) Si perimeter region. This processing step results in the formation of an array of inlaid pillars, each pillar typically measuring 2 μm×2 μm in cross section, with a depth in the range of 10 μm to about 100 μm. The converter material is then etched back to reveal the upper surface 870 of the substrate matrix, as shown in FIG. 9G. The resultant surfaces 870 and 855 are then planarized, per the teachings of the parent patent application (e.g., via a plasma etch).

Referring again to FIG. 9G, it is seen that the central pedestal consists of inlaid $^{10}$B pillars within a Si matrix, whose surface is p+ doped. Thus, a Si p-i-n diode array structure is formed, inlaid with $^{10}$B pillars, whose current flows vertically downward from the p+ doped pedestal surface 870 and, subsequently, laterally outward along the n+ doped layer to the perimeter region 855.

The final step in this process, as shown in FIG. 9H, is the formation of electrodes via the deposition of blanket, conformal, conductive metalized layers 880 that bound the detector. One electrode 881 consists of an ohmic contact formed on the top surface of, the pedestal, while the other electrode 882 consists of an ohmic contact formed along the perimeter region that surrounds the central $^{10}$B pillared pedestal. This technique results in a neutron detector capable of a high gamma discrimination factor, owing to the thin region below the array of $^{10}$B pillars, inlaid within a Si diode array matrix. Furthermore, the resultant structure is mechanically stable since the thin detector wafer is bonded to a solid member (the passive, insulating handle wafer).

Pillarized neutron detectors, augmented with monolithic active or passive layers to electronically gate the neutron detector or absorb undesirable gamma rays or other deleterious radiation flux.

This embodiment teaches methods to further enhance the gamma discrimination factor of the neutron detector by augmenting any or all of the above four embodiments with electronic gating techniques to actively discriminate against gamma rays. In addition, an embodiment is described that can extend the functional lifetime of the sensor through the use of a passive sacrificial layer wherein radiation damage (color centers, defects, etc.) of high-energy interactions can occur with minimal effect on the neutron detector. The auxiliary implementations can be monolithically formed onto the neutron detector, resulting in a rugged, robust, self-aligned structure.

Figure 10:
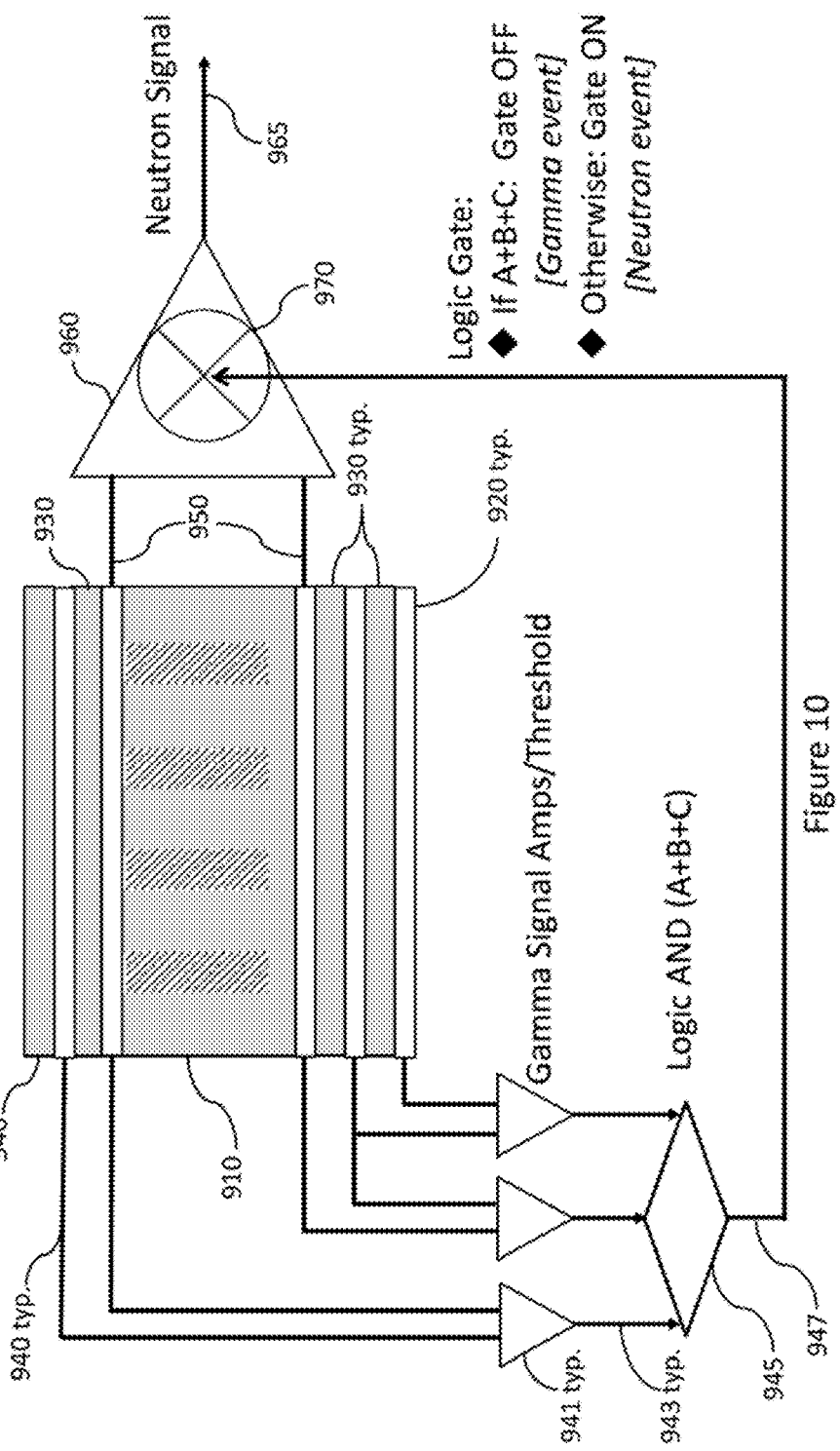
FIG. 10 shows a detector that integrates the basic neutron pillar structure with a monolithic, independent set of one or more gamma-ray detectors for enhanced gamma discrimination and enhanced radiation immunity to potential defect centers.

Examples of such auxiliary enhancement techniques are shown in FIG. 10, as applied to a basic neutron detector 910. The neutron detector is bound by a pair of electrodes 920, whose output current across contacts 950 is detected by amplifier 960. The amplifier is electronically gated via logic control input 970, with a resultant output signal 965. Surrounding the detector are one of more active and/or passive monolithic structures that can enhance the gamma discrimination factor, as well as improve the lifetime and performance of the detector in the presence of deleterious damaging radiation flux.

In one example, the neutron detector is augmented with one of more auxiliary gamma ray (or, other ionizing particle interaction) sensors. These sensors can consist of a basic solid-state detector, in the form of an ionizing material 930, which can be a layer of Si, bound by a pair of electrodes 920. These detectors can be monolithically formed on one or both surfaces (i.e., upstream and/or downstream) of the neutron detector, and, can be arranged as a single or cascaded set of sensors. One skilled in the art will appreciate that the number and arrangement of the sensors, their specific material(s), layer thicknesses and/or dopants will be a function of the environment and application space in which the neutron detector is to be implemented, including, but not limited to, the expected radiation flux and the specific attributes of the deleterious radiation (particles, energy, etc.), as well as the interaction cross sections of the desired events to be detected (i.e., thermal neutrons) relative to the those of the competing radiation and their respective detection efficiencies.

Returning to FIG. 10, an example of an active gamma ray discrimination system is shown in the case of one upstream and two downstream gamma ray detectors. The output 940 of the respective gamma ray detectors are directed to a respective set of amplifiers 941, with optional threshold control. In this example, the output logic level of each respective amplifier 943 is conditional on the gamma ray signal level exceeding a programmable threshold level. In this example, the logic outputs 943 are directed to a three-way AND module 945, whose output logic level 947 is HIGH if all three inputs are HIGH (this indicated that detection and temporal coincidence of a gamma event), and LOW otherwise. This logic level is then directed to the gate input port 970 of the neutron signal amplifier 960. Contingent on the absence or presence, respectively, of a gamma event, the amplifier will or will not, respectively, provide a neutron output signal 965. One skilled in the art will appreciate that the logic requirements that define the presence or absence of a competing event will determine the logic tree for a given scenario, including the joint probability of the sensors in terms of false alarms and tagging of events, etc.

Returning to FIG. 9, an example of a passive modality is shown that can improve the consistency and reliability of a neutron detector over time. In this example, a passive layer 940 is monolithically deposited on the detector module, upstream of the detector and possible active discrimination sensors. The function of this passive layer is to perform as a sacrificial component of the overall detector. It is well-known that deleterious radiation incident onto a detector can, over time, degrade its performance. An example of such a degradation mechanism results from the formation of color centers was well as crystalline and structural defects due to external radiation. These damage sites can compromise the efficiency, sensitivity and signal-to-noise attributed of a given detector. By placing a passive layer 940 upstream of the detector, the occurrence of damaging radiation in the active detector can be reduced, since, in such cases, there is a finite probability that the damaging radiation effects will be more confined to the sacrificial layer. The number of defects in a passive layer instead of in the active detector will maintain the performance metrics of the detector significantly over time relative to exposing the detector directly to the radiation. One skilled in the art will appreciate the systems tradeoffs of such sacrificial layers in terms of detector lifetime on the one hand, and, sensitivity and efficiency on the other hand.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method, comprising:
    providing a structure including a p+ region on a first side of an intrinsic region and an n+ region on a second side of said intrinsic region, wherein the thickness of said intrinsic region comprises a thickness selected to achieve a desired neutron to gamma discrimination;
    removing material from (i) one of said p+ region or said n+ region and (ii) said intrinsic region to produce pillars with open space between each pillar of said pillars, wherein said pillars have a pitch within a range from about 0.1 μm to about 10 μm and a height within a range from about 10 μm to about 200 μm;
    filling said open space with a neutron sensitive material comprising $^{10}$B;
    forming a first electrode in contact with said pillars; and
    forming a second electrode in contact with the one of said first side or said second side that is on a side opposite of said intrinsic layer with respect to said first electrode.

2. The method of claim 1, wherein said neutron to gamma discrimination comprises at least 1.0E+04.

3. The method of claim 1, wherein said thickness comprises less than about 120 μm.

4. The method of claim 1, wherein said intrinsic region comprises a thickness of about 50 μm.

5. The method of claim 1, wherein said structure comprises a thickness within a range from about 50 μm to about 200 μm.

6. The method of claim 1, wherein said intrinsic region comprises a float zone wafer or an epitaxial grown wafer.

7. The method of claim 1, wherein said pillars comprise a pitch selected from a group consisting of (i) within a range from 1 μm to about 3 μm and (ii) about 2 μm.

8. The method of claim 1, wherein said pillars comprise an aspect ratio selected from the group consisting of (i) within a range from about 100:1 to about 10:1, (ii) within a range from about 25:1 to about 10:1 and (iii) about 25:1.

9. The method of claim 1, wherein said p+ region or said n+ region of said pillars comprises a doping density of at least 1E+18 dopants per cm$^3$.

10. The method of claim 1, wherein said structure comprises a handle wafer.

11. The method of claim 10, wherein said handle wafer comprises a doping density of at least 1E+18 dopants per cm$^3$ of conductive semiconductor.

12. The method of claim 10, wherein said handle wafer is selected from the group consisting of an insulating wafer and a wafer with an insulating top layer.

13. The method of claim 10, wherein said handle wafer comprise an etched area to decrease the area under the pillars to increase gamma rejection.

14. The method of claim 1, wherein the thickness of said intrinsic layer under said pillars is within a range from about 0 μm to about 100 μm.

15. The method of claim 1, wherein the thickness of said intrinsic layer under said pillars is within a range from about 0 μm to about 10 μm.

16. An apparatus, comprising:
    a structure including a p+ region on a first side of an intrinsic region and an n+ region on a second side of said intrinsic region, wherein the thickness of said intrinsic region comprises a thickness selected to achieve a desired neutron to gamma discrimination;
    pillars formed of (i) one of said p+ region or said n+ region and (ii) a portion of said intrinsic region, wherein said pillars have space between each pillar of said pillars, wherein said pillars have a pitch within a range from about 0.1 μm to about 10 μm and a height within a range from about 10 μm to about 200 μm;
    a neutron sensitive material comprising $^{10}$B located in said space;
    a first electrode in contact with said pillars; and
    a second electrode in contact with the one of said first side or said second side that is on a side opposite of said intrinsic layer with respect to said first electrode.

17. The apparatus of claim 16, wherein said neutron to gamma discrimination comprises at least 1.0E+04.

18. The apparatus of claim 16, wherein said thickness comprises less than about 120 μm.

19. The apparatus of claim 16, wherein said intrinsic region comprises a thickness of about 50 μm.

20. The apparatus of claim 16, wherein said structure comprises a thickness within a range from about 50 μm to about 200 μm.

21. The apparatus of claim 16, wherein said intrinsic region comprises a float zone wafer or an epitaxial grown wafer.

22. The apparatus of claim 16, wherein said pillars comprise a pitch selected from a group consisting of (i) within a range from 1 μm to about 3 μm and (ii) about 2 μm.

23. The apparatus of claim 16, wherein said pillars comprise an aspect ratio selected from the group consisting of (i) within a range from about 100:1, to about 10:1, (ii) within a range from about 25:1 to about 10:1 and (iii) about 25:1.

24. The apparatus of claim 16, wherein said p+ region or said n+ region of said, pillars comprises a doping density of at least 1E+18 dopants per $cm^3$.

25. The apparatus of claim 16, wherein said structure compromise a handle wafer.

26. The apparatus of claim 25, wherein said handle wafer comprises a doping density of at least 1E+18 dopants per $cm^3$ of conductive semiconductor.

27. The apparatus of claim 25, wherein said handle wafer is selected from the group consisting of an insulating wafer and a wafer with an insulating top layer.

28. The apparatus of claim 25, wherein said handle wafer comprise an etched area to decrease the area under the pillars to increase gamma rejection.

29. The apparatus of claim 16, wherein the thickness of said intrinsic layer under said pillars is within a range from about 0 μm to about 100 μm.

30. The apparatus of claim 16, wherein the thickness of said intrinsic layer under said pillars is within a range from about 0 μm to about 10 μm.

\* \* \* \* \*